United States Patent
Wilen et al.

(10) Patent No.: US 8,577,735 B2
(45) Date of Patent: Nov. 5, 2013

(54) INTERACTIVE GIFTING SYSTEM AND METHOD WITH PHYSICAL AND ELECTRONIC DELIVERY

(75) Inventors: Richard Wilen, Boca Raton, FL (US); Kevin Wilen, Boca Raton, FL (US); Gordon M. Kramer, Coral Springs, DE (US)

(73) Assignee: WILopEN Products, LC, Deerfield Beach, FL (US)

( * ) Notice: Subject to any disclaimer, the term of this patent is extended or adjusted under 35 U.S.C. 154(b) by 0 days.

(21) Appl. No.: 12/464,740

(22) Filed: May 12, 2009

(65) Prior Publication Data
US 2010/0017278 A1 Jan. 21, 2010

Related U.S. Application Data

(60) Provisional application No. 61/052,377, filed on May 12, 2008.

(51) Int. Cl.
*G06Q 30/00* (2012.01)
*G06Q 40/00* (2012.01)
*G06Q 30/06* (2012.01)
*G06Q 40/02* (2012.01)
*G06Q 40/04* (2012.01)

(52) U.S. Cl.
CPC .............. *G06Q 30/06* (2013.01); *G06Q 40/02* (2013.01); *G06Q 40/04* (2013.01)
USPC ............................. 705/26.1; 705/39; 705/37

(58) Field of Classification Search
USPC ................. 705/26, 27, 26.1, 37, 39
See application file for complete search history.

(56) References Cited

U.S. PATENT DOCUMENTS

| | | | |
|---|---|---|---|
| 498,761 | A | 6/1893 | Becker |
| 2,504,277 | A | 4/1950 | Otterson |

(Continued)

FOREIGN PATENT DOCUMENTS

| | | |
|---|---|---|
| EP | 0695649 | 2/1996 |
| GB | 2285412 | 7/1995 |

(Continued)

OTHER PUBLICATIONS

Sliwa, Carol, "Gift Certificates Sales on Rise," Computerworld, Nov. 29, 1999, p. 9.*

(Continued)

*Primary Examiner* — Aimee A Shah
(74) *Attorney, Agent, or Firm* — Johnson & Martin, P.A.; James David Johnson

(57) ABSTRACT

A method and system for gifting using interactive multimedia and a gifting system. The gifting system can include a gift card, a website for redeeming the gift card, a plurality of gift representations corresponding to actual gift items, and means for advertising additional retail products or services to consumers. The gift card can also include a greeting card and a unique card identifier associated with the user. The methods and systems can be used to advertise products to consumers, which can be purchased for personal use or for gifting. The system can be used to direct consumers to a card issuer's website. The system can include a customizable avatar to read aloud text converted to an audio speech file that relates to the gift item. The system can also include a game in which points redeemable for gift items are awarded to the website's users for answering advertisement-related questions correctly.

21 Claims, 10 Drawing Sheets

(56) References Cited

U.S. PATENT DOCUMENTS

| | | | |
|---|---|---|---|
| 3,141,549 A | | 7/1964 | Koehler |
| 4,103,820 A | | 8/1978 | Mathison |
| 4,195,864 A | | 4/1980 | Morton |
| 4,441,270 A | | 4/1984 | Crowell |
| 4,543,082 A | | 9/1985 | Stenner |
| 4,733,856 A | * | 3/1988 | Gunther, Jr. ............... 270/1.02 |
| 5,133,496 A | | 7/1992 | Davidson |
| 5,377,904 A | | 1/1995 | Michlin |
| 5,437,478 A | | 8/1995 | Gaines |
| 5,513,117 A | | 4/1996 | Small |
| 5,870,718 A | * | 2/1999 | Spector ..................... 705/26.5 |
| 6,315,206 B1 | | 11/2001 | Hansen |
| 6,330,544 B1 | | 12/2001 | Walker |
| 6,470,608 B1 | | 10/2002 | Edwards |
| 6,493,970 B1 | | 12/2002 | McCarthy |
| 6,601,755 B2 | * | 8/2003 | Gillespie, IV ................ 229/70 |
| 6,725,587 B2 | | 4/2004 | Collins |
| 6,732,459 B1 | | 5/2004 | Clark |
| 6,746,052 B1 | | 6/2004 | Reynolds |
| 6,754,636 B1 | | 6/2004 | Walker |
| 6,922,673 B2 | | 7/2005 | Karas |
| 7,188,762 B2 | | 3/2007 | Goade |
| 7,204,048 B2 | | 4/2007 | Kershner |
| 7,209,889 B1 | * | 4/2007 | Whitfield ................ 705/14.39 |
| 7,315,828 B1 | * | 1/2008 | McCarthy et al. ........... 705/14.1 |
| 7,610,224 B2 | * | 10/2009 | Spiegel ........................ 705/28 |
| 2003/0120505 A1 | * | 6/2003 | Spiegel ........................ 705/1 |
| 2003/0130907 A1 | | 7/2003 | Karas |
| 2003/0150141 A1 | | 8/2003 | Waldron |
| 2003/0150142 A1 | | 8/2003 | Street |
| 2004/0046035 A1 | | 3/2004 | Davila |
| 2004/0099730 A1 | | 5/2004 | Tuchler |
| 2004/0139318 A1 | | 7/2004 | Fiala |
| 2004/0205138 A1 | | 10/2004 | Friedman |
| 2004/0254833 A1 | * | 12/2004 | Algiene ........................ 705/14 |
| 2005/0165641 A1 | * | 7/2005 | Chu et al. .................... 705/14 |
| 2005/0229450 A1 | | 10/2005 | Larsen |
| 2005/0263587 A1 | | 12/2005 | Martinez |
| 2005/0275870 A1 | | 12/2005 | Elarde |
| 2005/0284927 A1 | * | 12/2005 | Wilen ........................ 235/380 |
| 2006/0000127 A1 | | 1/2006 | Schindele |
| 2006/0186196 A1 | | 8/2006 | Schultz |
| 2006/0200362 A1 | | 9/2006 | Paciolla |
| 2006/0224452 A1 | | 10/2006 | Ng |
| 2006/0255154 A1 | * | 11/2006 | Newbrough et al. ........ 235/486 |
| 2006/0266665 A1 | | 11/2006 | Clarke |
| 2006/0273153 A1 | | 12/2006 | Ashby |
| 2006/0293963 A1 | * | 12/2006 | Hoblit ............................ 705/15 |
| 2007/0017973 A1 | | 1/2007 | Blank |
| 2007/0136085 A1 | * | 6/2007 | Wagner et al. ................. 705/1 |
| 2007/0157021 A1 | * | 7/2007 | Whitfield ...................... 713/156 |
| 2007/0168863 A1 | | 7/2007 | Blattner |
| 2007/0182155 A1 | * | 8/2007 | Duffy .......................... 283/116 |
| 2007/0187487 A1 | | 8/2007 | Wilen |
| 2007/0192784 A1 | | 8/2007 | Postrel |
| 2007/0288340 A1 | * | 12/2007 | Kravitz et al. ............. 705/36 R |
| 2008/0195460 A1 | | 8/2008 | Varghese |
| 2008/0208745 A1 | | 8/2008 | Friedman |
| 2008/0294977 A1 | | 11/2008 | Friedman |
| 2009/0063297 A1 | | 3/2009 | Dooley |
| 2009/0222367 A1 | * | 9/2009 | Jenkins et al. ................. 705/35 |
| 2009/0281951 A1 | * | 11/2009 | Shakkarwar ................... 705/67 |
| 2009/0283594 A1 | | 11/2009 | Walton |
| 2010/0269380 A1 | | 10/2010 | Wilen |
| 2010/0314276 A1 | | 12/2010 | Wilen |
| 2011/0025037 A1 | | 2/2011 | Wilen |
| 2011/0124390 A1 | | 5/2011 | Wilen |
| 2011/0125607 A1 | | 5/2011 | Wilen |

FOREIGN PATENT DOCUMENTS

| | | | |
|---|---|---|---|
| WO | WO 0167364 A1 | * | 9/2001 |
| WO | 2007092057 | | 8/2007 |
| WO | 2011026123 | | 3/2011 |

OTHER PUBLICATIONS

Anonymous, "GiftCertificates.com(TM) Announces New Merchants Added to Industry Leading Gift Card Product Portfolio," Business Wire, Dec. 5, 2007.*

* cited by examiner

| PERSON |
|---|
| FIRST NAME |
| LAST NAME |
| EMAIL ADDRESS |

| ADDRESS |
|---|
| PERSONID |
| ADDRESS 1 |
| ADDRESS 2 |
| CITY |
| STATE |
| POSTAL CODE |
| COUNTRY CODE |

| FINANCIAL |
|---|
| PERSONID |
| ADDRESSID |
| CREDIT CARD NUMBER |
| CREDIT CARD EXPIRATION |
| CREDIT CARD TYPE |

| LOYALTY POINTS |
|---|
| PERSONID |
| LOYALTY POINTS |
| LOYALTY POINTS EARNED |
| LOYALTY POINTS REDEEMED |
| LOYALTY POINTS VALUE |

| GIFT |
|---|
| GIFT SKU |
| GIFT PRICE |
| GIFT INFORMATION |
| GIFT DESCRIPTION |

| OCCASSION |
|---|
| SENDER PERSONID |
| RECEIVER PERSONID |
| OCCASSION DESCRIPTION |
| OCCASSION DATE |

| SHIPPING |
|---|
| SENDER PERSONID |
| RECEIVER PERSONID |
| GIFTID |
| OCCASSIONID |
| SHIPPING DATE |

FIG. 8

INTERACTIVE GIFTING SYSTEM AND METHOD WITH PHYSICAL AND ELECTRONIC DELIVERY

CROSS-REFERENCE TO RELATED APPLICATION

This application claims the priority from U.S. provisional patent application Ser. No. 61/052,377 filed May 12, 2008. The foregoing application is incorporated in its entirety herein by reference.

FIELD OF THE INVENTION

The invention relates to methods and systems for gifting. More particularly, the invention relates to methods and systems for gifting to consumers utilizing gift cards, gifting systems and interactive multimedia.

BACKGROUND

Traditionally, advertising to consumers has been accomplished using passive means in that advertisements have been strategically presented in printed publications, on billboards, and through radio, television and internet-based media with the hope that consumers would read, view, listen to, or otherwise pay attention to the advertisements. These types of passive advertising are generally ineffective in that the advertiser usually has no means for knowing which consumers have seen or heard the advertiser's advertisement. The inability to collect information concerning the identity of the consumer and how closely the consumer scrutinized or paid attention to the advertisement has limited the value of traditional advertising systems and methods. The potential of data mining to collect consumer information related to advertising viewing and listening habits is underutilized by conventional advertising.

Some advertisers, namely retailers and manufacturers, have created gift cards that have been sold or provided to consumers as a means for driving business to their stores, product lines, or services. In this sense, the advertisers have used gift cards as an advertising tool to promote their retail products, services, and locations. Conventional gift cards pose several problems and disadvantages both in terms of a means of advertising as well as in terms of security, convenience, and personalization.

From a security standpoint, conventional gift cards are often manufactured from plastic having a thickness that is easily perceived by touch when a plastic gift card is inserted inside a conventional paper envelope. The difficulty in concealing traditional gift cards during mailing leaves the gift cards vulnerable to theft when the envelope containing the card has been deposited into a mailbox or during conveyance of the mail. Unless the recipient contacts the gift giver to express thanks or to otherwise indicate the recipient's receipt of the gift card, the gift giver is unlikely to know whether the intended gift recipient received the gift card or whether the gift card was intercepted by an unintended third party during mailing. In addition, traditional gift cards also often lack any means by which the card can be assigned to the gift recipient so that a different unintended recipient cannot utilize the gift card by making purchases. Once the gift giver purchases the gift card, the card is funded by the gift giver and any individual in possession of the card may make purchases using it. The failure of these gift cards to incorporate any identifying information pertaining to the gift recipient renders them an unsecure means to deliver a gift because the gift card can be used by anyone who has possession of the card since no form of identification is required by the card issuer to confirm the identity of the intended recipient prior to activating and redeeming the gift card.

Conventional gift cards also usually require a gift giver to visit a retail store to obtain the card and to fund the card at the retail location. The gift cards cannot be quickly and easily obtained. In addition, traditional gift cards are often sold or provided by merchants without providing a means for sending or mailing the gift card to the gift recipient. Retailers may expect the gift giver to purchase a separate greeting card within which the gift card can be enclosed and mailed to the gift recipient. Traditional gift cards are usually provided in standard formats with a limited number of designs and often lack any means for personalizing the gift card in a way that the gift giver may desire. The lack of personalization of conventional gift cards also detracts from the sentimental nature of the gift thereby rendering them less personal and often less appreciated and less memorable to the recipient. Conventional advertising and gift card systems may also include a web-based component that utilizes a persistent URL (pURL) to identify the consumer or a particular product or service, however, the pURL does not permit the personalization and customization features often desired by both the consumer as well as the advertiser.

As an advertising tool, because conventional gift cards are not personalized, they are disadvantageous for purposes of data mining by retailers and others who wish to obtain the contact information and shopping habit information for both gift givers and gift recipients. Traditional gift cards may not incorporate any interactive components such as customization by the gift giver or personalization of the gift card by the gift giver for its intended recipient. Because no personally identifying information of the gift recipient is related to the gift card, advertisers lose a valuable opportunity to gather information concerning the gift recipient, and therefore, are unable to advertise and promote other products or services to the gift recipient. The exclusion of interactive components that would permit customization and personalization of the gift card by the gift giver is also disadvantageous in that the advertiser has little or no opportunity to advertise and promote additional products to the gift giver for purchase for personal use or for additional gifting purposes.

A need exists for an interactive gifting and advertising method that uses secure customizable gift cards that entertain the gift giver and gift recipient and which can be used for data mining purposes to collect personal identifying information that can be related to each specific consumer's shopping and advertisement browsing habits.

SUMMARY

The systems and methods described herein pertain to an interactive gifting system that entertains and involves the consumer with its interactive design so as to encourage repeat business and functions as a means of data mining to allow targeted and predictive advertising to specific consumers. The gifting system can utilize a website, a global telecommunications system, a gift card, a remote server, funds data, and a means by which the gift card can be delivered from a gift giver to a recipient. The website can be accessed by the gift giver via a global telecommunications network and may include account management features that permit the gift giver to transfer funds to a card issuer. The gift card can include a unique card identifier, for example, a gift card number, that
} can be used by a card issuer to match the gift card to the funds transferred from the gift giver to the card issuer for purposes of funding the gift card.

The gift card may be a virtual e-card, for example, a card that is accessed by clicking on a web link that opens the e-card in a web browser; a printable email card; a two-dimensional gift card form that can include a single sheet having perforations to separate a detachable gift card, greeting card, and envelope; or a pre-scored and/or pre-folded, three-dimensional pop-up card such as the Assembleeze™ pop-up cards manufactured by WILopEN Products, LC, of Deerfield Beach, Fla., which are folded in such a way that a portion of the card "pops up" or rises when the card is changed from closed configuration to open configuration. The pop-up portion of the card may include a photograph, e.g., a photograph of the gift giver, artwork, a logo, alphanumeric text, or any other desired information or images. The three-dimensional pop-up cards can be in the form of a greeting card or a business card and may also include a gift representation that visually represents a gift item selected by the gift giver for the gift recipient. The gift card may be custom designed for or by the gift giver or may be selected by the gift giver from among one or more templates provided by the card issuer.

The remote server is connected to the global telecommunications network and can be used to store the funds data associated with the gift card. The finds data relates to the amount of funds transferred by the gift giver to the card issuer. The means for delivering or transmitting the gift card from the gift giver to the recipient may be a mailing or courier service, electronic mail (email), facsimile, attachment to or insertion into packaging (e.g., to a top of a pizza box) or printed publications (e.g., into a magazine), or any other suitable delivery means.

The gift card system is highly customizable by the user or gift giver so that the gift giver can personally control the entire gift-giving process, including, without limitation, selection of a gift item that can be merchandise, a service, or money, personalization of a real physical or virtual gift card, and timing of delivery of the gift card to the gift recipient. The gift giver is thus able to select and purchase gifts chosen naturally by the gift giver. In addition, once the gift recipient receives the gift card, the recipient has several options that can include redeeming the gift card for the gift item selected by the gift giver, rejecting the gift item selected by the gift giver and selecting a different gift item of the same or lesser value, rejecting the gift item selected by the gift giver and selecting a different gift item of greater value by contributing additional funds toward the purchase of the different gift, or re-gifting the gift card or its monetary value to another recipient.

The gift card system provides several advantages over the traditional plastic gift card distributed and sold by retailers. Because the gift card of the gift card system can be manufactured as a paper gift card, the thinness of the paper gift card (versus a conventional plastic card) enhances the surprise effect experienced by the recipient who cannot feel the paper card through the envelope into which the card is inserted. More importantly, however, because the paper gift card cannot be felt through the envelope in which it is mailed, the paper gift card is a more secure way to send a gift via mail. The presence of the paper gift card inside the envelope is not readily apparent to an individual who may intercept mail for purposes of stealing gift cards. On the other hand, a conventional plastic gift card is easily felt, and is thus discoverable, when placed inside a standard paper envelope.

The gift card system is also advantageous because the gift card has no value to anyone other than the recipient intended by the gift giver because the gift giver must provide certain predetermined identifying information related to the recipient. After this recipient information is entered into the secure card issuer website, the recipient information can be stored on the card issuer's remote servers. To activate the gift card, the recipient must also provide matching recipient information or enter into the website a password that was generated by the gift card system and delivered via email, mail, or another delivery means when the user purchased the gift card for the recipient. Another advantage of the gift card system is that the gift card can be used for a gift other than the gift originally intended by the gift giver. The gift card system also provides an advantage in that the gift cards can be distributed inexpensively and quickly in the form of a paper gift card or as an electronic or digital card.

The method of the invention is also advantageous because a gift card account website may be used to advertise to the gift givers and recipients who access the website to fund and to activate the gift cards. By advertising through game-style product questions, advertisers (e.g., retailers and manufacturers) can both entertain users of the website and educate those users about the advertiser's products. Users of the website and system also benefit because points earned by answering product questions correctly can be redeemed immediately by a user for items such as downloadable movies and songs or pay-per-view movie credits.

Another advantage of the methods described herein is the ability of the system to advertise to people having vision and hearing impairment, people who are illiterate, and people who do not speak the predominant language of the card issuer or retailer's location. An avatar of the system used in conjunction with text-to-speech software can play or "read" aloud a description of products for sale on the card issuer or retailer's website in the user's own language.

The systems and methods of the invention are also advantageous to the retailer because, unlike when a gift giver purchases a gift item in a retail store and gives the actual gift item to the recipient, in the event that the gift recipient decides to exchange the gift item for a different gift item, the retailer does not incur any costs related to restocking. The retailer is able to avoid restocking costs because the gift item was represented in the form of a gift representation as part of the gift card, but the actual gift item selected by the gift giver for the gift recipient was never physically removed from the retailer's inventory.

Still another advantage of the systems described herein is that the gift recipient can access an account created through a system website to check the balance, purchases made, and other information related to the gift card. The gift recipient may also be provided with access to these account features via an interactive voice response system (IVR).

Yet another advantage of the systems and methods of this invention is that the gift card can be printed and mailed to the gift recipient in addition to being delivered electronically, e.g., by e-mail, to increase the likelihood that the gift recipient receives the gift card. The name of sender can be pre-printed on all the components of a gift card package such as, for example, the printed electronic gift card, a greeting card, and instructions, of the multi-component gift card package. The gift giver can print or hand-write the recipient's name on the same components to further increase the likelihood that the recipient reads the greeting card and gift card. Similar to the electronic gift card, the printed gift card can be viral in nature in that the recipient is directed to the card issuer's website in order to redeem the gift card for the gift item selected by the gift giver or for another gift item selected by the recipient.

The system can also be interactively used by advertisers such as, for example, retailers, service providers, and manufacturers, who may be given access to the gifting system to automatically upload their product and service information for advertisement to users of the website.

Accordingly, the invention features a gifting system that can include a website accessible by a gift giver via a communications network. The website can include account management features that permit the gift giver to transfer funds to a card issuer. The gift card system can further include a gift card, which features a unique card identifier. The gift card system can also include a remote server connected to the communications network, which stores finds data associated with the gift card. The finds data can relate to the finds transferred by the gift giver to the card issuer. The gift card system can also feature a means for the gift giver to deliver the gift card to a gift recipient.

In another aspect, the invention can feature the means to deliver being an electronic greeting card.

In another aspect, the invention can feature the gift card being a physical gift card that is detachably connected to a tongue of an envelope.

In another aspect, the invention can feature the gift card being inserted into and concealed within a pouch of the envelope when the envelope is configured in an unsealed closed configuration.

In another aspect, the invention can feature the gift card being pulled from a pouch of the envelope so as to be visible when the envelope is configured in an open configuration.

In another aspect, the invention can feature the gift card being detachable at a perforation from an affixed portion that is connected to an inner surface of the envelope tongue.

In another aspect, the invention can feature the gift card, once detached, being insertable into a pouch of the envelope. The envelope can be sealable in a sealed closed configuration for delivery to the recipient.

In another aspect, the invention can feature the gift card being a physical gift card that is attached by adhesive to an inner surface of a tongue of an envelope.

In another aspect, the invention can feature the means for delivering including an envelope and a greeting card.

In another aspect, the invention can feature the gifting system further including a catalog that is contained within an envelope.

In another aspect, the invention can feature the gift card system including an envelope wherein the envelope is manufactured around the gift card and other contents that are enclosed within the envelope.

In another aspect, the invention can feature the envelope including a detachable stub.

In another aspect, the invention can feature the detachable stub being connected to a tongue of the envelope.

In another aspect, the invention can feature the detachable stub including a gift representation.

In another aspect, the invention can feature the gift representation including an image of a gift item that is redeemable by the recipient using the gift card.

The invention also features a method of gifting that can include the steps of: (a) providing a printed material including a plurality of gift representations each representing an actual gift item; (b) assigning a unique printed alphanumeric identifier stored on a server to each of the plurality of gift items represented by the plurality of gift representations; (c) associating tracking data with each alphanumeric identifier; (d) providing a website connected to the server via a communications network by which a user can purchase at least one gift item selected from among the plurality of gift representations appearing in the printed material; (e) requiring the user to enter the alphanumeric identifier assigned to the selected gift item into a graphical user interface of the website; (f) requiring the user to provide personal information through the graphical user interface of the website; and (g) associating the alphanumeric identifier with the user.

Another method of the invention features the alphanumeric identifier being a hexadecimal number.

Another method of the invention features the alphanumeric identifier being a stock keeping unit (SKU).

Another method of the invention can include the step of analyzing the tracking data, personal information, browsing habits, and shopping habits of the user collected during the user's access to the website to determine the user's predicted shopping preferences.

Another method of the invention can include the step of presenting an advertisement to the user based upon the user's predicted shopping preferences.

Another method of the invention can include the step of purchasing a gift item through the website to be gifted by the user to a gift recipient, wherein the user is a gift giver.

Another method of the invention can include the step of delivering a gift card to the gift recipient. The gift card can feature a gift representation of the actual gift item selected and purchased by the gift giver.

Another method of the invention can include the step of redeeming the gift card for the actual gift item by the gift recipient providing the gift recipient's personal information through the graphical user interface of the website.

Another method of the invention can include the step of recording data related to the shopping and purchasing activities of the gift giver and gift recipient accessing the website.

Another method of the invention can include the step of suggesting gift items to the gift giver for purchase by the gift giver during the gift giver's subsequent visits to the website based upon the gift giver's shopping and purchasing activity data.

Another method of the invention can include the step of permitting the gift recipient to redeem the gift card for the gift item selected and purchased for the gift recipient by the gift giver.

Another method of the invention can include the step of permitting the gift recipient to reject the gift item selected and purchased by the gift giver and to select a different gift item chosen by the gift recipient.

The invention also features a method of gifting. The method can include the step of providing a gifting system featuring a retail website that includes a plurality of items for sale. The retail website can be communicatively connected to a server via a communications network. Text related to each of the plurality of gift items can be provided by the gifting system. An avatar featuring software can be displayed via a graphical user interface of the website, and the gifting system can be equipped with text-to-speech software. The text-to-speech software can be communicatively linked to a database stored on a server, and the database can include preselected user information, wherein the database is stored on a server. The text-to-speech software can be used to convert the text and preselected user information into audio data that, by software programming, can visually appear to be read or spoken aloud by the avatar. The avatar of the gifting system can provide dynamic personalization to the system by "reading" aloud the preselected user information associated with the user to whom a registered account that is being accessed belongs. The audio data can be played aloud using an audio playback device communicatively connected to the website.

Another method of the invention can include the step of directing at least one of a gift giver and a gift recipient to the retail website using a gift card.

Another method of the invention can include the step of programming the avatar to state the user's name in a greeting upon access of the user to the website.

Another method of the invention can include the step of programming the avatar to state personal information associated with the user at least once during each access to the website by the user.

The invention also features a method of gifting that can include the steps of: (a) providing a list of gift representations corresponding to a plurality of gift items from which a gift giver may select one or more of the plurality of gift items for purchase; (b) selecting a gift item from among the list of gift representations; (c) using a computer, accessing a website that is communicatively connected to a communications network; (d) collecting and transmitting first personal information related to the gift giver through the website to a data storage device; (e) collecting and transmitting second personal information related to a gift recipient and provided by the gift giver to the data storage device; (f) purchasing the gift item selected from among the gift representations; and (g) creating an electronic greeting card from the gift giver to the gift recipient using the first and second personal information. The electronic greeting card can include an electronic gift card, and the electronic gift card can feature a gift representation of the gift item selected by the gift giver. The method can also include the steps of: (h) transmitting the electronic greeting card from the gift giver to the gift recipient using the second personal information and communications software comprising access to the communications network; (i) using the electronic gift card, directing the gift recipient to the website; and (j) redeeming the gift representation for the gift item.

Another method of the invention can feature the list being a printed material displaying the gift representations.

Another method of the invention can include the step of printing the electronic gift card upon its receipt by the gift recipient.

Another method of the invention can include the step of redeeming the printed electronic gift card for the gift item at a retail store.

Another method of the invention can include the step of permitting the gift recipient to select a different gift item than the gift item selected by the gift giver prior to redeeming the gift card.

Another method of the invention can include the step of permitting the gift recipient to assign the gift card to a third party for purposes of gifting the gift item to the third party, wherein the third party can redeem the gift card to receive the gift item.

The invention also features a method including the steps of: (a) playing an advertisement viewed by a user, wherein the advertisement features information related to a retail item; (b) asking the user a series of questions related to the retail item; (c) awarding the user points based upon the number of questions answered correctly by the user; and (d) permitting the user to redeem the points earned for a reward item.

Another method of the invention features the reward item being at least one item selected from among the following: a downloadable video, a downloadable music file, a downloadable audio file, a downloadable audiobook, a streaming video file, a streaming audio file, a downloadable image file, a downloadable computer screen saver, a downloadable video file, a movie rental voucher, and other suitable retail goods and services.

Another method of the invention features the retail item being a good or a service.

Another method of the invention includes the step of permitting the user to gift either the points earned or the reward item selected by the user to a gift recipient.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

BRIEF DESCRIPTION OF THE DRAWINGS

FIGS. 7-8 are flow charts that show other methods by which a gift giver can obtain a gift card that can be delivered to a recipient who accesses a card issuer's website to redeem the gift card for a gift.

DETAILED DESCRIPTION

Figure 1:
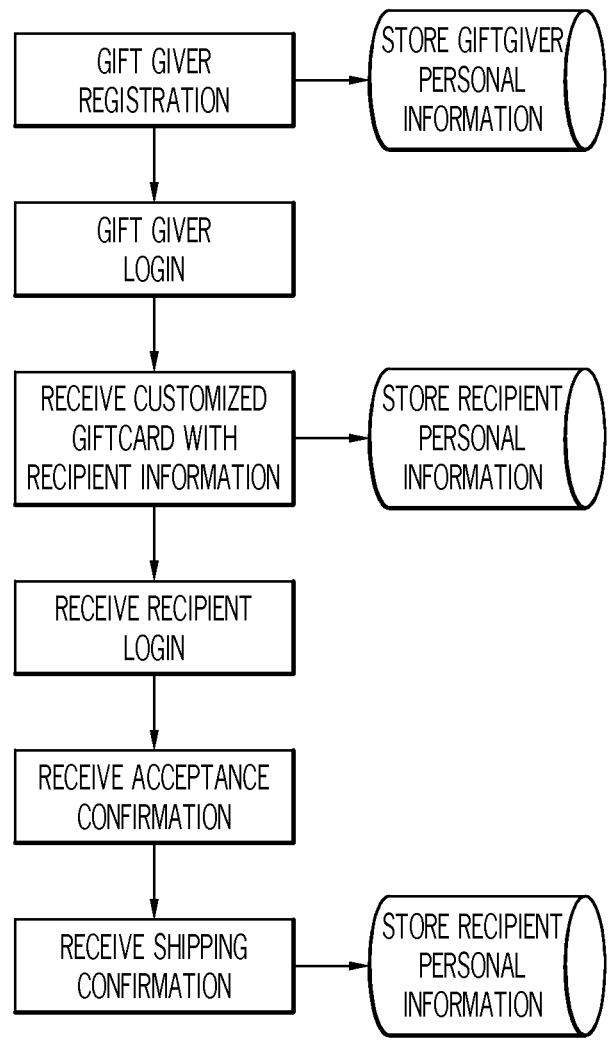
FIGS. 1-5 are flow charts that show one method by which a gift giver can purchase a gift in the form of a gift card for delivery to a recipient.
Figure 2:
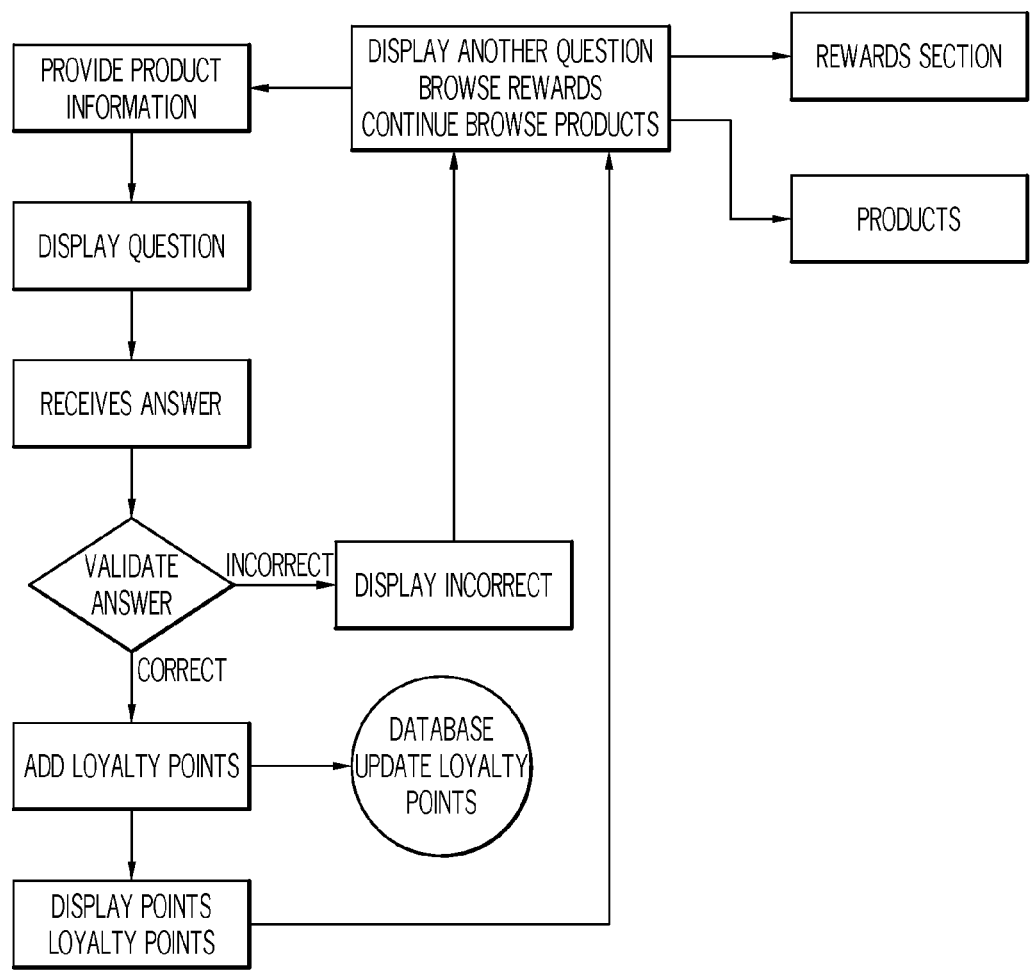
Figure 3:
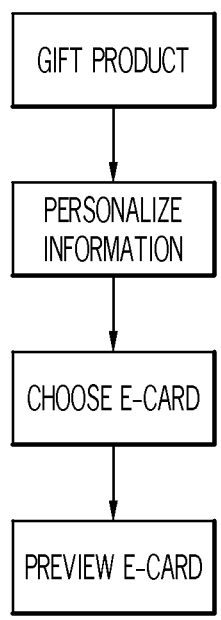
Figure 4:
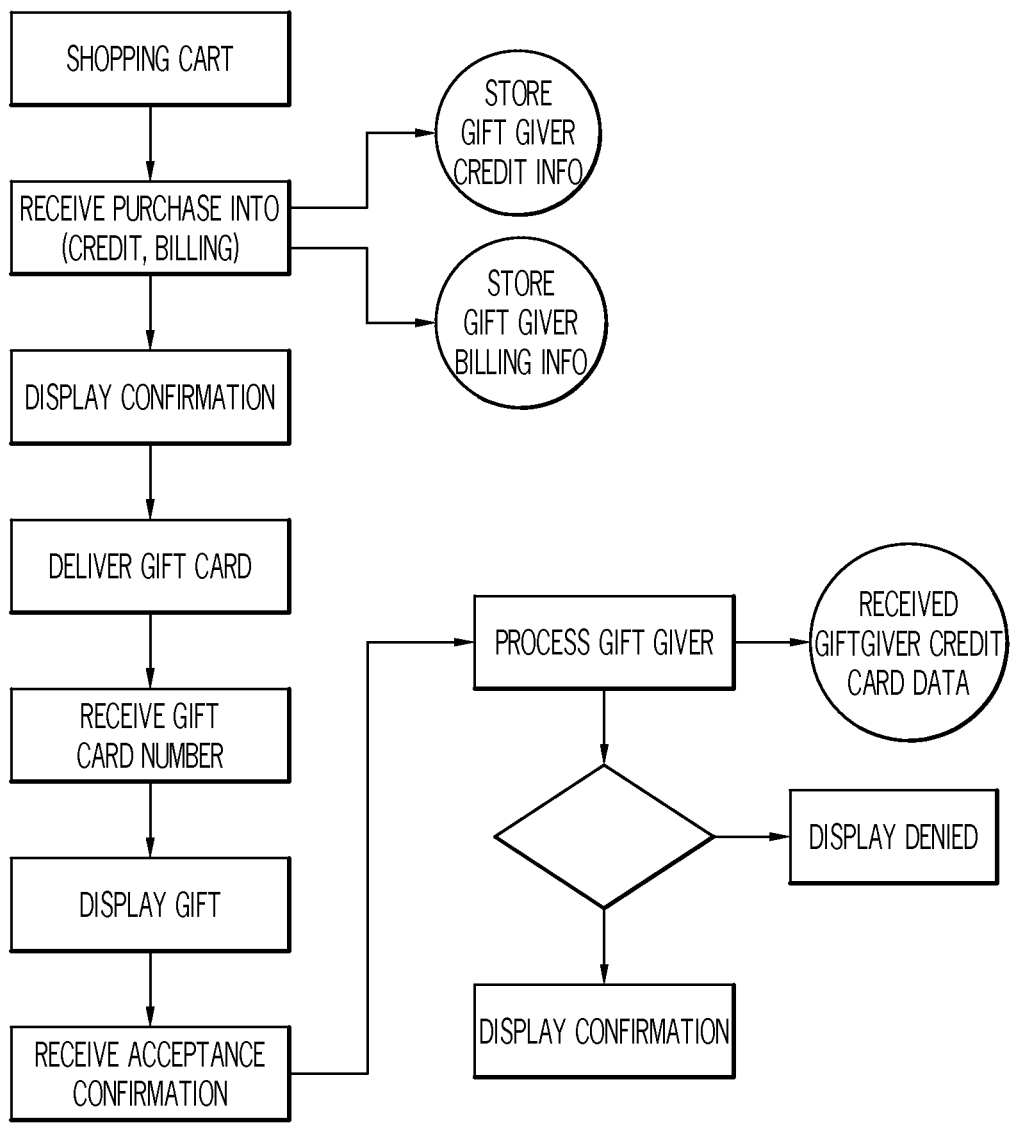
Figure 5:
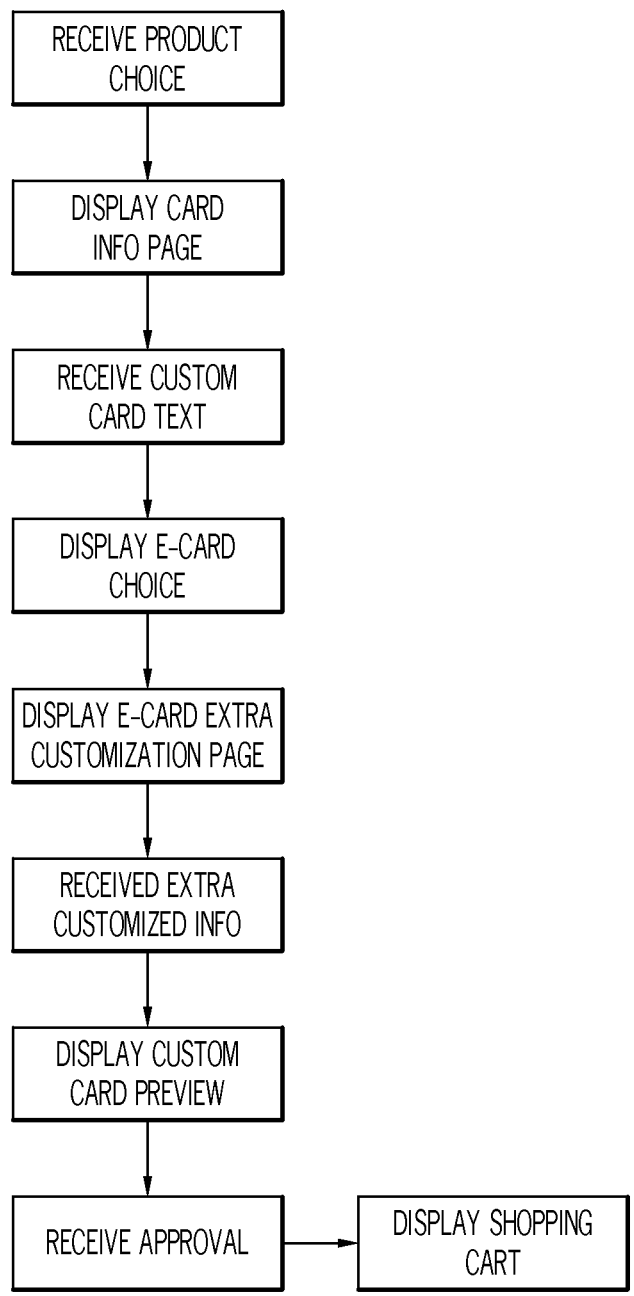
Figure 6A:
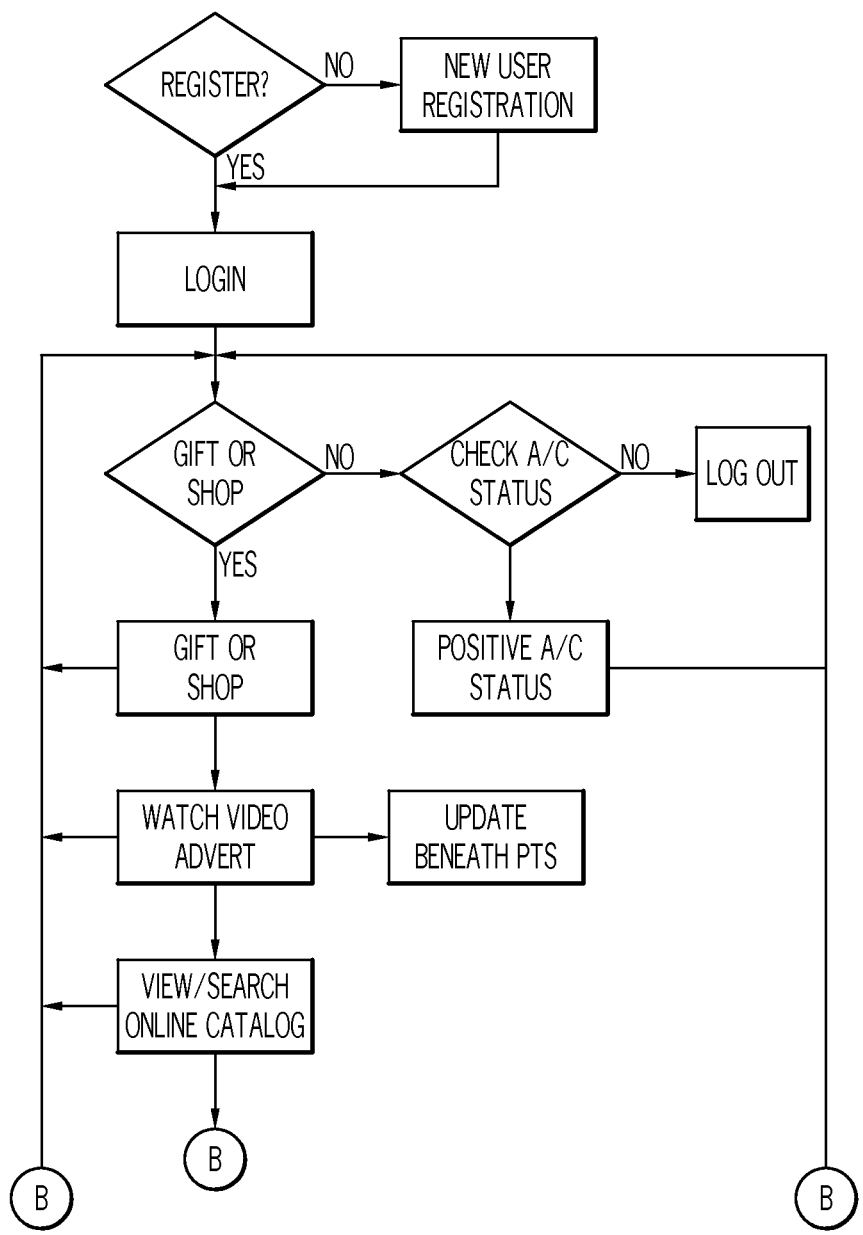
FIGS. 6A-6B are flow charts that show another method by which reward points can be earned by a gift giver or a recipient by accessing a card issuer's website.
Figure 6B:
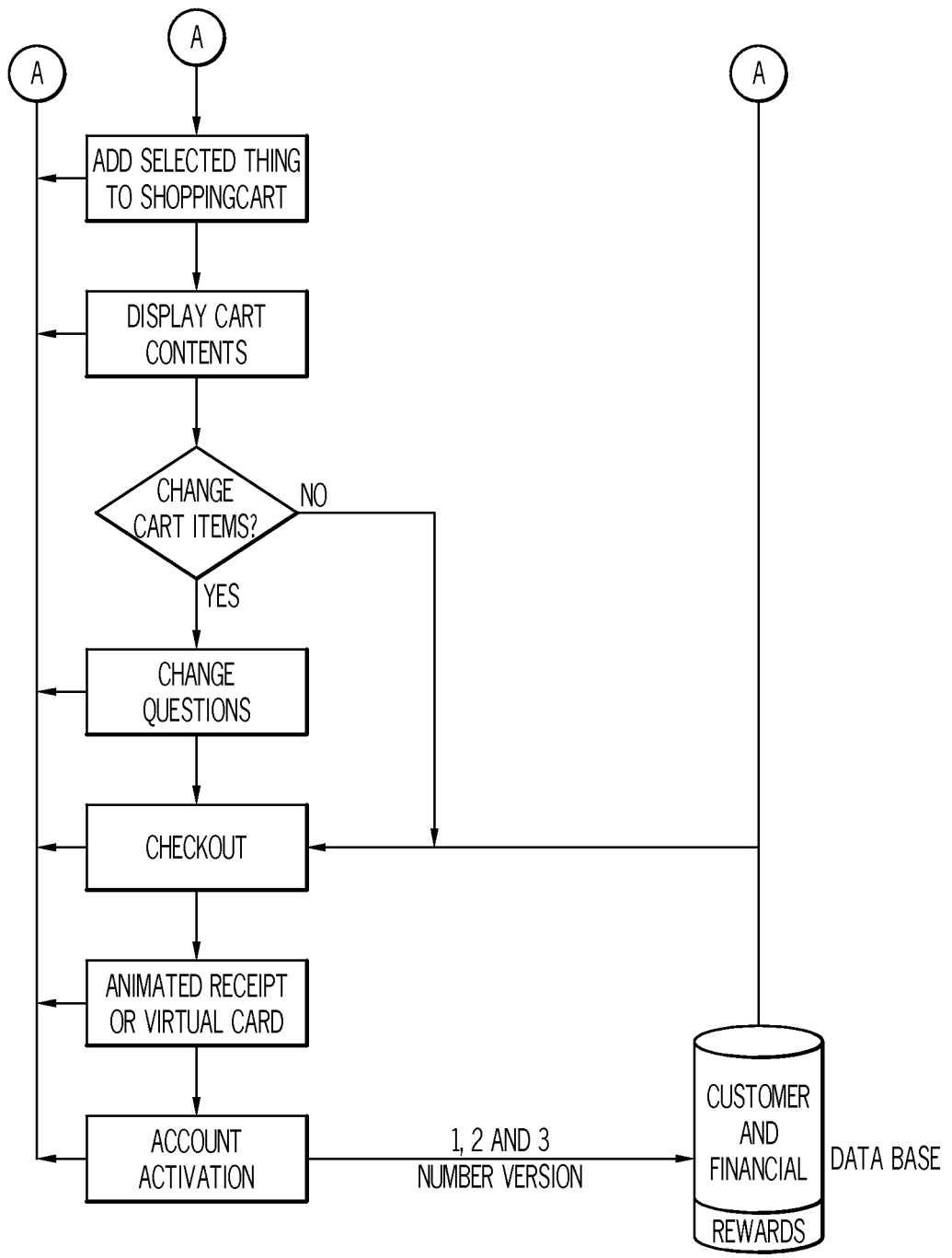
Figure 7:
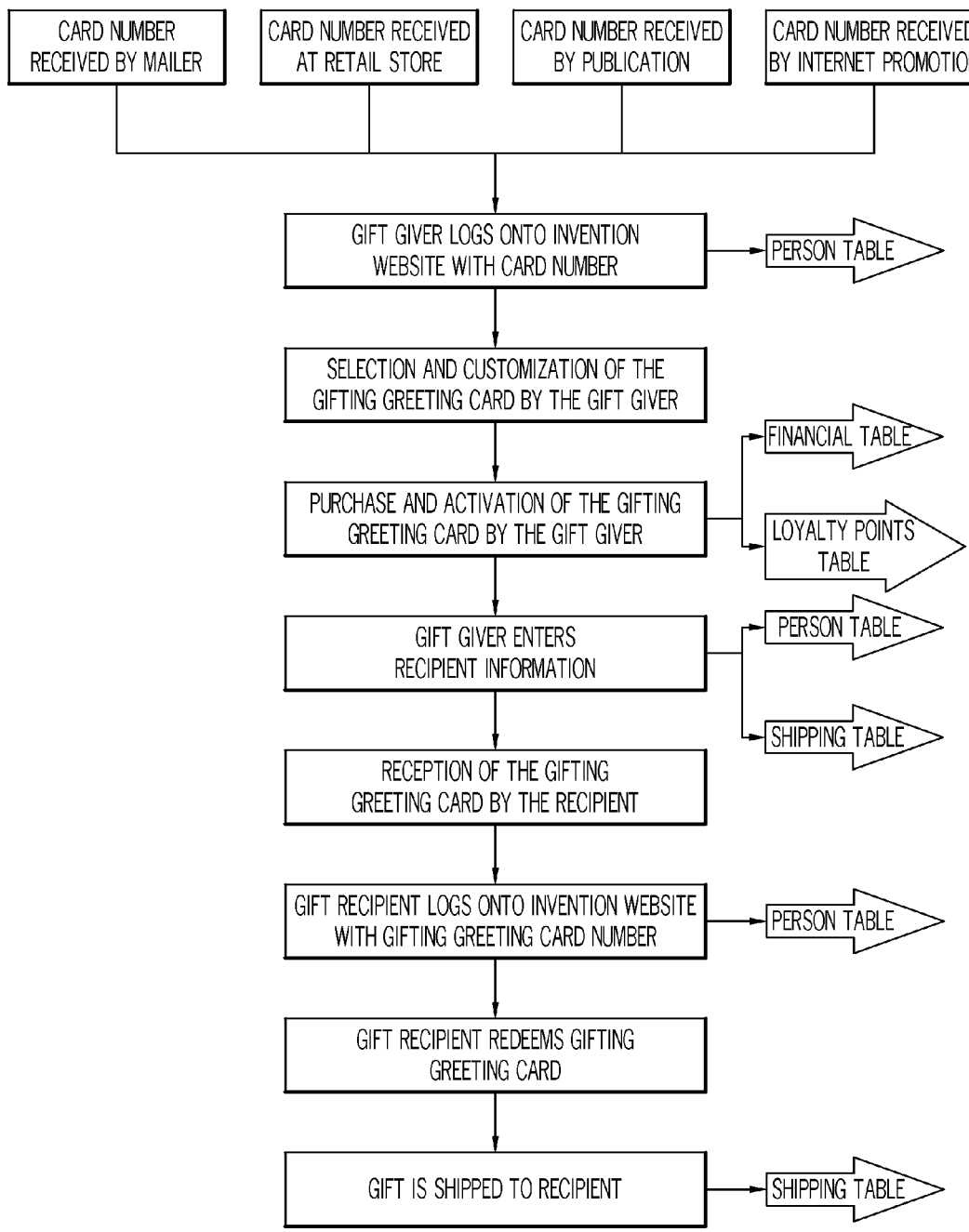

The invention provides interactive gifting systems and methods that can include multimedia components. The gifting system can be utilized by a gift card issuer to promote and advertise retail products and services to a user through gifting, entertainment, and game and rewards methods. The user can be a consumer, and the consumer can be a gift giver or a gift recipient. The card issuer can be an advertiser, a retailer, a manufacturer, or a service provider.

The invention can include a gift card system that allows gift-giving by a gift giver to a gift recipient and serves as an advertising and marketing tool for goods and services produced, provided, and sold by manufacturers and retailers. The gift card system can include a gift card, which may be a physical gift card, an electronic gift card, or both. The system may include only a single gift card so that the gift giver can purchase his or her own greeting card and envelope within which the gift card can be inserted.

In an exemplary embodiment, the gift card can be a combination gift card, greeting card, instruction sheet, and envelope. These components can form a gift card package that can be delivered to the gift recipient. The gift card package can also include a catalog, a brochure, a pamphlet, or another suitable insert containing images or descriptions of products that can be purchased by the gift giver for the gift recipient. These components of the exemplary embodiment may be manufactured by any suitable printing and folding means. Each gift card can be personalized with a unique card identifier such as, for example, a hexadecimal number or a standard sixteen-digit gift card number that may be accepted for payment at point-of-sale (POS) terminals at retail locations. The gift card can also be marked with or have printed or affixed thereon a product or retailer name or logo. The gift card can also have a description of a gift item selected by the gift giver printed thereon or affixed thereto. In other embodiments, either or both of the greeting card and the envelope may also include product or retailer names, logos, or descriptions printed thereon or affixed thereto.

In another embodiment, the system may include only a gift card, a greeting card, and an envelope. In still another embodiment, the system may include only a gift card and an envelope. In still other embodiments, either or both of the greeting card and the instructions may be omitted. In one embodiment, the system can further include a receipt. In one embodiment, the gift card system can include an envelope that is manufactured around the gift card and other contents (e.g., greeting card, instruction sheet, and catalog) so that these items are enclosed within the envelope simultaneously with the manufacturing of the envelope.

The physical gift card can be a gift card constructed from paper, plastic, or another suitable material on which indicia may be printed, embossed, engraved, stamped, or affixed. The electronic gift card can be a downloadable file, a web page, a virtual card or an e-mail, any of which may contain alphanumeric text and other type characters, images, audio data, video data, or other types of data suitable for inclusion in or attachment to the electronic gift card. The gift card can be redeemable for a gift item. The gift item can be a good, e.g., a retail item such as a shirt or a television, or a service, such as, for example, a manicure or a golf lesson. In another embodiment, the gift card can be redeemable for money.

In embodiments in which the gift card is a physical gift card, the gift card can be a printable email card, a two-dimensional gift card, or a three-dimensional card. In one embodiment, the two-dimensional gift card can include a form that can features a single sheet having perforations to separate a detachable gift card, greeting card, and envelope. In another embodiment, the three-dimensional gift card can be pre-scored and/or pre-folded and may include a pop-up portion, which is folded in such a way that a portion of the card "pops up" or rises when the card is changed from a closed configuration to an open configuration. The pop-up portion of the card may include a photograph, e.g., a photograph of the gift giver, artwork, a logo, alphanumeric text, or any other desired information or images. The three-dimensional pop-up cards can be in the form of a greeting card or a business card and may also include a gift representation that visually represents a gift item selected by the gift giver for the gift recipient. The gift card may be custom designed for or by the gift giver or may be selected by the gift giver from among one or more templates provided by the card issuer.

The gift card can be personalized by the gift giver. The personalized gift card can be further customized using personal information of the gift giver and/or of the recipient. Personal information can include a name, address, location information, photograph, e-mail address, birth date, anniversary date, or other personally significant information related to either or both of the gift giver and the gift recipient.

The gift card system can further include a gift representation of at least one gift item. In an exemplary embodiment, the gift card system can include a plurality of gift representations each of which depicts a unique gift item. The gift representations can be depicted in the form of a photograph or a drawing of the gift item. In another embodiment, the gift representation can be a written or typed name of the gift item and may further include a written or typed description of the gift item. The gift representations can be displayed as part of a list or other collection of gift representations.

The gift representation may be displayed on printed material or electronically. For example, the gift representation may be printed in a magazine, a catalog, a brochure, or other printed matter. In another example, the gift representation can be displayed as an electronic image or text on a website or in an e-mail.

The gift card or a plurality of gift cards, e.g., a multi-pack, can be delivered to the gift giver who may select from among the gift cards, each of which may include a different gift representation, a gift item to be purchased for the gift recipient. The gift card or a package containing the plurality of gift cards can be delivered to the gift giver by direct mail or obtained by the gift giver at a retail store location. The gift card or package of gift cards can be delivered to the gift giver upon the gift giver's request or may be mailed or otherwise delivered to the gift giver unsolicited. The gift representations appearing on each gift card can be printed, embossed, engraved, or stamped onto each gift card. In another embodiment, the gift representation can be printed on a stamp having an adhesive backing that can be affixed to the gift card. In embodiments in which a gift card package is provided to the gift giver, the package may include a catalog that can contain a plurality of gift representations each of which is printed on a detachable stamp. The gift giver can select one or more gift items by detaching the gift representation stamp for each selected gift item and attaching the stamp or stamps to one or more gift cards to be delivered by the gift giver to the gift recipient.

The gift card system can also include a website having a graphical user interface (UI) that is accessible via a communications network such as, for example, the Internet. In other embodiments, the communications network can be a local area network (LAN), a wide area network (WAN), a global area network (GAN), an intranet, or another suitable communications network. The graphical user interface of the website can be capable of receiving information input or uploaded by a user of the website (such as, for example, the gift giver or the gift recipient) and of transmitting the information to a server. The server can be a remote server. The server can include a processor for electronically manipulating the data transmitted to the server via the website. The server can also include a data storage device, which serves to store information submitted through the UI and transmitted by software of the website to the server via the communications network. Information submitted through the UI and website can include personal information of the gift giver and gift recipient, credit card or other account number information enabling the gift giver or gift recipient to make a purchase, and photographs, images, audio files and video files permitting customization of the gift card or of a greeting card by the gift giver.

In one embodiment, the website can include account management features that permit the gift giver to transfer funds to the card issuer. The remote server connected to the global telecommunications network can be capable of storing funds data associated with the gift card. The funds data relate to the funds transferred by the gift giver to the card issuer.

The website can include a dynamic button navigation system permitting the user to easily and quickly navigate the gift representations representing gift items that are displayed on the website. The dynamic button navigation system can also be used by the gift giver or gift recipient to navigate between retailers whose products are available for purchase on the card issuer's website.

In one method, the gift giver can send a physical or electronic gift card to the gift recipient by purchasing the gift item and ordering the gift card using the gift card system website.

In another method, where the gift giver has received or obtained a physical gift card by direct mail or other delivery means, the gift giver may activate the gift card by funding the gift card to purchase the gift item represented by the gift representation thereon using purchasing features on the gift card system website. The gift card can then be mailed by the gift giver or otherwise delivered by the gift giver to the gift recipient. The gift recipient can then activate the card by accessing the system website, providing identifying personal information or a code provided by the gift giver, and using gift redemption features of the website to redeem the gift card for the gift or to select a different gift item than the one selected by the gift giver. In this method, the gift giver engages in a first (or purchase phase) activation of the gift card initially and the gift recipient engages in a second (or redemption phase) activation of the gift card to redeem the gift card for the gift item or for another item selected by the gift recipient.

In an exemplary embodiment of the gift card system, the gift card can include the unique card identifier. The unique card identifier may be a unique account or identification number (e.g., a series of alphanumeric characters such as a series of sixteen numbers), a unique bar code encoding a unique account or identification number, a chip storing and encoding a unique account or identification number, or another unique identifier that associates the gift card with an account of the user into which monetary funds have been deposited. The unique card identifier can also be associated with the user and the user's personal information.

In an exemplary embodiment, the unique card identifier can be a hexadecimal number, also known as a hexadecimal digit or hex number. The hexadecimal digit may be standard in that it may be represented by a combination of the numbers 0-9 and the letters A-F. The hexadecimal number may include a check digit that can be used to detect errors in the input of the hexadecimal digit, for example, where one digit of the hexadecimal number is mistyped.

The hexadecimal number can be used to identify the gift card, its original distribution method (e.g., direct mail or insertion into a publication), and the original recipient (i.e., the gift giver). The hexadecimal number can also be used by the gift giver to perform a first activation in which the gift card is activated and funded by the gift giver. The gift card can then be delivered to the gift recipient in a gift card package. If the gift giver is a new user, the website may prompt the gift giver to register to create a new account before permitting the gift giver to activate and fund the gift card.

Upon receipt of the gift card package, the gift recipient can access the system website and submit the same hexadecimal number to perform a second activation of the gift card that confirms receipt of the gift card by the correct intended recipient. During this second activation, the website may also provide the recipient with an option to send a printed or electronic "thank you" message to the gift giver.

In an exemplary embodiment, the hexadecimal number can be used in connection with internet-based transactions and gift redemptions conducted through the system website. In another embodiment of the system, the hexadecimal number can be submitted through the website and converted by software to a printable document that can be used by the gift recipient at a brick-and-mortar retail location having a POS system. Once printed, the printable document, i.e., the printed gift card, can include a bar code in which a standard sixteen-digit gift card number is encoded that will be accepted by a POS terminal. In another embodiment, the printed gift card can include the printed standard gift card number and no bar code. The hexadecimal number can also be used by system software to identify the user accessing the website so as to customize the website based upon data available that is related to the specific user.

The hexadecimal number may be printed or otherwise notated on or in a source such as, for example, the gift card, which can be either a physical card, e.g., a gift card constructed from paper or plastic, or a virtual gift card or "e-gift card." Hexadecimal numbers may also be printed on or in any of numerous other sources including, without limitation, catalogs, newspaper advertisements, catalog and newspaper inserts, brochures, magazines, conventional greeting cards, and virtual greeting cards or "e-greeting cards."

Each hexadecimal number can be unique and may be used as a primary identification ("primary ID") for one or more items of information. For example, the primary ID can be a name, address, e-mail address, telephone number, facsimile number, publication name, publication issue date, publication volume, card issuer name, account number, or any other item of information that identifies a person, entity, or publication. Publications may include, for example, brochures, catalogs, magazines, newspapers, and advertising inserts.

Each hexadecimal number can also be used as a secondary identification ("secondary ID") for one or more items of information. For example, the secondary ID can be the name of a publisher or retailer, an effective date, an in-house date, a publication date, a date of transaction, a source of a mail list, a recipient's name, a recipient's address, a recipient's e-mail address, a specific product, a gift giver's name, a gift giver's address, a gift giver's e-mail address, a type of transaction, or other information that can be used to identify the gift giver, the recipient, the publisher, or the retailer.

In an exemplary embodiment, the source can be an e-gift card that may feature the name and address of a direct mail recipient of the e-gift card as the primary ID. The secondary ID can be one or more of the publisher, the retailer, the specific product, the publication date of the publication, the date of the transaction, and the type of transaction.

In another embodiment, the source can be a virtual greeting card that may feature the recipient's e-mail address as the primary ID. The secondary ID can be one or more of the gift giver's e-mail address, specific product, publisher, retailer, date of transaction, and the type of transaction.

In another embodiment, the source can be a catalog such as, for example, a store catalog. The primary ID can be the name and address of the catalog recipient. The secondary ID can be one or more of the catalog publisher, retailer, in-house date, effective dates, the source of the mail list, specific product in the catalog, and recipient's e-mail address.

In another embodiment, the source can be a newspaper insert that may feature the issue date and publication volume as the primary ID. The secondary ID can be a specific product.

In another embodiment, the source can be a newspaper advertisement that may feature the issue date and publication volume as the primary ID. The secondary ID can be a specific product.

In another embodiment, the source can be a brochure and the primary ID can include the publication issue date and publication volume. The secondary ID can be one or more of a specific product, the publisher, the retailer of a specific product, the publication date, the effective date, the name and address of the brochure's recipient, and the recipient's e-mail address.

In still another embodiment, the source can be a magazine and the primary ID can be the magazine recipient's name and address. The secondary ID can be one or more of the magazine publisher, the in-house date, effective date, the source of the mail list, a specific product, and the recipient's e-mail address.

In yet another embodiment, the source can be a conventional gift card or conventional greeting card. The primary ID can be the card issuer and an account number. The secondary ID can be one or more of the recipient's e-mail address, a specific product, the date of transaction, and the type of transaction.

The hexadecimal number can be used in conjunction with one or more computer databases to track the purchasing habits of consumers including both gift givers and recipients. The information obtained by the retailer, publisher, or advertiser using the tracking features can be used for predictive advertising in which related products are suggested to the gift giver or to the recipient after a first product is purchased. For example, the system may use data related to a gift giver's purchase of a birthday gift for a recipient during the previous year to recommend products or services for purchase by the gift giver for the recipient's birthday during the current year. In one embodiment, the hexadecimal number can be used in connection with social networking websites such as, for example, Facebook™ or MySpace™, to obtain information and data pertaining to the users of the social networking website. The data and information obtained may relate to advertisements viewed within the social networking website by its users. This user data and information can be compiled in a computer database and linked to products or services that can be displayed in advertising targeted to and customized for specific individuals or groups of individuals.

In another embodiment, the unique identifier can be a stock keeping unit (SKU) where each product is assigned a separate and unique SKU. The SKU can be a universal SKU system that may be used to identify products by multiple retailers or manufacturers rather than a conventional SKU that uses digits assigned by each retailer or manufacturer using its own numbering system. The hexadecimal number can be used in place of the SKU or in combination with the SKU.

In one embodiment, a hexadecimal number appearing in a catalog or other publication, once entered into the system by the user using the system website, can be used by the system to identify the user and the publication, for example, where the publication is a subscription sent regularly to the user. The catalog can further include unique SKU's each of which identifies a unique retail item or service or gift item displayed in the catalog. The user can select a gift item or retail item or service for purchase by entering the item's associated SKU into the UI of the website. The system then directs the user to a web page of the website that provides information about the selected item as well as purchasing options.

The hexadecimal number associated with a gift item appearing in a publication can be entered into the website's UI by the user, which is then identified by the system and matched with the location or IP address of a specific web page on the retailer or card issuer's website that can display an image of the gift item and a description of the gift item. The system associates the hexadecimal number with the user so that the system can track, among other data, the user's history concerning publications read by the user, products viewed on the system website by the user, and products purchased through the system website by the user.

The gift card can be used by the gift giver to make a monetary gift to the recipient that can be used to purchase goods or services from a specific retailer, manufacturer, or service provider, or, in one exemplary embodiment, to make a gift to the recipient that is a specific good sold or produced by a specific manufacturer or retailer or a specific service provided by a specific predetermined service provider.

For example, the gift card could be for a specific magazine subscription, a specific perfume, or a specific set of golf clubs. The gift card could also be redeemable for a service such as a manicure or trip to a day spa. The gift card may include a photograph or other image of the gift selected by the gift giver for the recipient. The gift card may further include a web address for the card issuer's website where the recipient can redeem the gift card. The gift card can also feature the purchase price or fund amount of the card so that the recipient will know the amount of funds available to use for purchases made when redeeming the card. The gift card can be obtained by the gift giver from a card issuer, who may be a retailer, manufacturer, advertiser, or a third party working on behalf of the retailer, manufacturer, or advertiser.

The gift card system also includes means for the gift giver to deliver the gift card to the recipient. The delivery means can be a separate envelope into which the gift card can be inserted, an integrated gift card-envelope combination, or an email or other electronic or digital delivery means that can be viewed on a display monitor and/or printed by a printer connected to a computer.

The gift card may be a stored-value card that includes a magnetic strip to encode the card number and funds data. In an exemplary embodiment, finds data is the amount of money transferred to the card issuer by the gift giver to fund the card. The funds data can be physically stored as data encoded on a magnetic strip of the gift card, however, in an exemplary embodiment, the funds data is stored on a remote server that is accessible via a global telecommunications network. The remote server can be maintained by an issuer of the card.

Figure 9A:
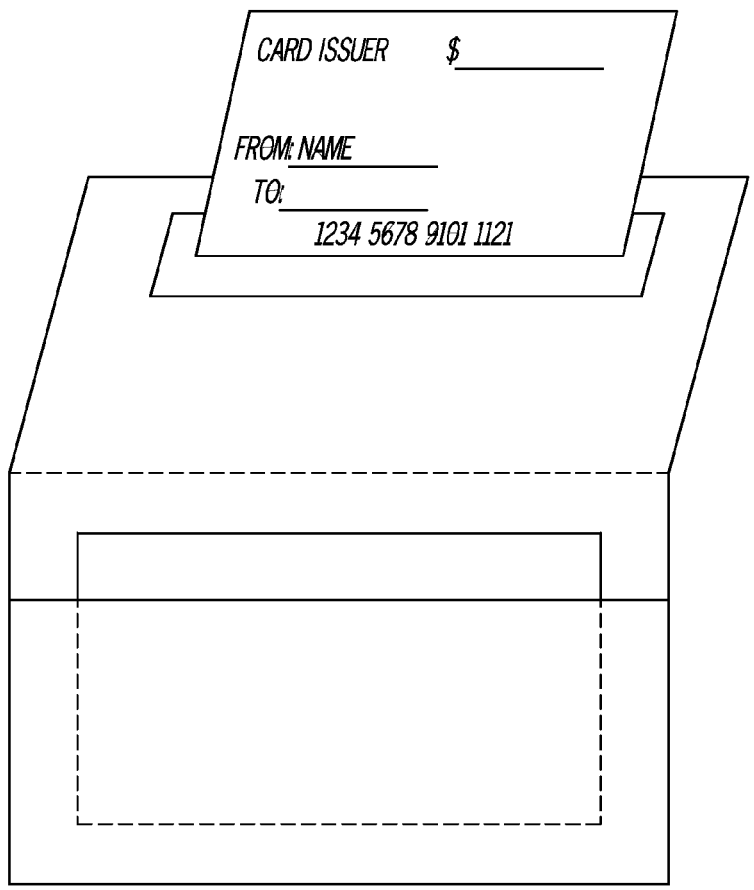
FIG. 9 is a front planar view of the combined gift card and envelope with the envelope shown containing a separate detached brochure.
Figure 9B:
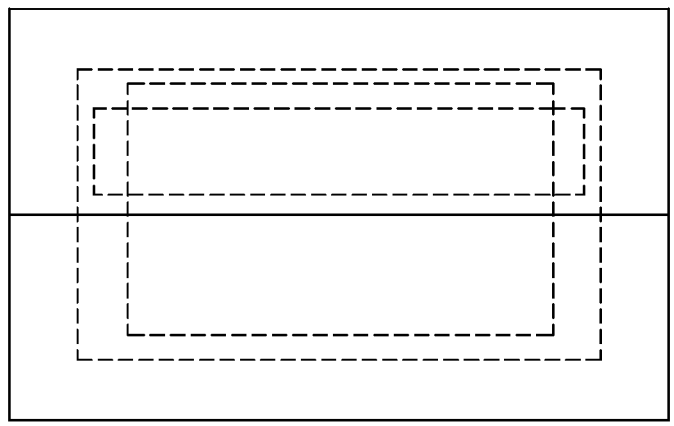

In one exemplary embodiment, the gift card can be a paper card. The paper gift card may be a closed-end mailer that includes a combined envelope to which the card is connected for mailing by the gift giver to the recipient. The combined gift card and envelope can be a single unitary piece and may also include a separate brochure as shown in FIG. 9. The envelope may include a bar code to enable tracking by the card issuer of the individuals to whom each gift card is sent, particularly when the gift cards are distributed unsolicited inside magazines, attached to packaging, or by broadcast mass-mailings or emails. The brochure can be used to provide directions to the gift giver concerning how to find the gift card or directions to the recipient regarding how to redeem the card. In another embodiment, the brochure can include advertising information related to other products or services sold or provided by the card issuer, retailer, or manufacturer.

In another embodiment, the gift card may also include a portion that is a greeting card or, in another alternate embodiment, the gift card can be a greeting card that includes a unique card identifier, e.g., a hex number or a gift card number, that permits the card to be funded securely by the gift giver and securely activated and redeemed by the intended recipient.

The paper gift card can be in the form of a coupon or as part of a packaged envelope, card, and advertising information that can be mass-distributed by mail either randomly or through targeted mailings to specific individuals or households. The coupon version of the gift card can include a card number to permit funding of the card by the gift giver and activation of the card by the recipient at a retail location or online through the card issuer's website. The gift card can be used and delivered to a gift giver as a stand-alone brochure, a package insert, or a direct mail piece. In another embodiment, the paper gift card can be inserted unattached or bound into a magazine, catalog, newspaper or other publication that is will be purchased or viewed by individuals of unknown identity. In still another embodiment, the gift card can be predictive in nature, for example, where the card issuer obtains information from retailers or another source related to an individual's contact information and shopping preferences to distribute the card to a targeted set of individuals.

As shown in FIG. 9, the paper gift card can be connected to a tongue of an envelope that can be delivered via mail or other delivery means. The envelope can be oriented in an open configuration so that contents of the envelope such as, for example, the gift card, gift card instructions, a catalog, a brochure, or a greeting card, can be accessed by the recipient. The envelope can also be oriented in a closed configuration to enclose or seal the contents inside the envelope. The gift card can be detachably connected to an inner surface of the envelope's tongue by an adhesive. The gift card may comprise an affixed portion attached to the envelope tongue by the adhesive or other attachment means. The gift card and affixed portion may be separated by a perforation that permits the gift card to be detached from the affixed portion by tearing. The gift card can be sized and attached to the inner surface of the envelope tongue in such a way that a top edge of the gift card may extend further than and hang beneath a bottom edge of the envelope tongue. The gift card can be inserted into a pouch (or interior space) of the envelope when the envelope is oriented in the closed configuration. When the envelope tongue is grasped and opened by the gift giver, the gift card is pulled out of the pouch of the envelope so as to be visible to the user.

The gift card may further include space to write or print the gift recipient's name. Once the gift giver has detached the gift card from the affixed portion, the gift giver may insert the gift card into the pouch of the envelope and then seal the envelope in a sealed configuration for delivery to the gift recipient.

In another embodiment, the gift card can be detachably connected to the envelope via perforations. The gift card can remain entirely or partially exposed outside of the envelope's pouch when the envelope is oriented in the closed configuration so as to be visible. When the envelope tongue is oriented in the closed configuration, the gift card can still be visible to the user because the gift card may protrude from and hang beneath a bottom edge of the envelope tongue. After the gift card has been activated and funded, the gift giver can detach the gift card from the bottom edge of the envelope tongue and insert the card into the envelope which can be sealed in the closed configuration for delivery to the gift recipient.

In another embodiment, the envelope tongue can further include a detachable portion or stub connected to a bottom edge of the tongue. The detachable portion can include an image or description of the gift item purchased by the gift giver and redeemable by the gift recipient using the gift card enclosed within the envelope. The detachable portion may be detached by the gift giver and discarded or detached and retained by the gift giver as a record of the gift item purchased for the gift recipient.

In one embodiment, the paper gift card can be attached to a box, for example, to the top of a pizza box, or to other packaging in which a product is delivered to consumers. The paper gift card can be attached to the box or other packaging by a magna-strip or other resins or glues, although any suitable attachment means may be used for the purpose. Magna-strips may also be utilized to attach the gift card inside, on, and to magazines and other publications.

In another embodiment, the gifting system may use a multi-pack, which can be a package or envelope containing multiple gift cards for a plurality of products or services or from a plurality of retailers or manufacturers. The multi-pack can be delivered to the consumer, e.g., by direct mail, so that the consumer can browse the gift cards and select one or more to activate and find for gifting to a gift recipient. The gift giver's opportunity to select one or more gift cards for activation and gifting to a recipient from among the plurality of gift cards contained by the multi-pack provides a type of "gift card mall" experience that is delivered directly to the gift giver's home. The gift giver can select a gift from among the gift representations provided in the multi-pack and activate and fund the gift card via the website from a location and computer that is convenient for the gift giver. The multi-pack can be mailed to a consumer upon the consumer's request or can be mailed to a group of consumers whose contact information is obtained from a mailing list compiled or acquired by the card issuer or advertiser.

The multi-pack and the plurality of individually unique gift cards contained therein can be manufactured using a single stream in-line process, by a sheet-fed operation, manually, or by any other suitable printing and folding means. To efficiently create the multi-pack, a variable printing machine may be used to print unique cards sequentially via inkjet printing means. The sequential printing feature of the printer allows a single set of a plurality of unique gift cards, e.g., gift cards for a plurality of different gifts or from a plurality of different retailers or manufacturers, to be printed as one sequential set that can be packaged together rather than requiring printing and subsequent collation of the different cards. The gift cards can be variably printed so that each card differs in the name of the consumer, the gift representation, the retailer, or the manufacturer printed on each card in the set that is to be packaged. In this way, each consumer can receive a multi-pack that is individually personalized for the specific user and which can contain gift cards that are the same as or different from those contained in any other multi-pack. Personalization of each multi-pack for each specific user can be accomplished using personal information contained in a database related to each user. The printing machine can collate the cards automatically rather than requiring each set of identical gift cards to be separately printed and subsequently collated by manual or mechanical means. In one embodiment, the multi-pack may also contain one or more mailable greeting cards and envelopes in addition to the plurality of gift cards. In another embodiment, the multi-pack can be made available for pick-up by gift givers in a retail location. Each gift card in the multi-pack may include a unique hexadecimal number, standard gift card number, and/or bar code printed thereon. Other information can also be printed on each unique gift card within the multi-pack to further personalize the gift card such as, for example, the gift giver's name and address, the product name or product image, and product information. Similar personalized data can be printed on the greeting card in embodiments in which the multi-pack contains one or more greeting cards.

In another exemplary embodiment, the gift card can be digital or electronic. For example, the gift card may take the form of an email that includes a unique card identifier. The email may be printable so that once sent by the gift giver to the recipient, the recipient may receive, print, and use the gift card to make a purchase. The electronic gift card may be designed by the gift giver using design features available on the website. For example, the website may permit the gift giver to include a photograph of the gift giver on the gift card.

As shown in FIGS. 1-5, 6A-6C, and 7-8, the invention also features a method in which a gift giver creates and logs into an account on a card issuer's website and accesses account features on the website that enable the gift giver to order, personalize, fund, address, and send a personalized gift card to a recipient. Once the gift card has been purchased, the website may generate a receipt, which can be an animation, to notify the gift giver that the purchase transaction has been completed and that the gift card will be delivered to the recipient. The receipt may be delivered to the gift giver in an email. Upon receipt of the gift card, which may be a printed paper gift card that is mailed or otherwise delivered or an electronic gift card (or e-gift card or e-card) that is emailed or otherwise electronically transmitted to the recipient, the recipient can redeem the gift card by accessing the card issuer's website and following instructions provided therein to activate the card. In another embodiment, the recipient can activate the card via a telephone system of the card issuer.

In embodiments utilizing the e-gift card, the e-gift card may include a link to an advertisement for the gift item or for other products or services sold by the gift item's retailer. In another embodiment, the advertisement may be attached to the e-gift card as a separate file, which can be a multimedia file.

As shown in FIG. 1, the gift giver may register for access to the website, and once registration is completed, may receive a log-in or username as well as a personal identification number (pin) or password to access the website. Personal information entered by the gift giver during registration can be saved on a remote server maintained or controlled by the card issuer. The gift giver may choose a gift to be purchased and given to the recipient as a gift card that can be redeemed online or at a retail store. To send a gift card to the recipient, the gift giver must enter predetermined personal information related to the recipient, which can also be stored on the remote server. The website may generate a password that can be provided to the recipient to activate the gift card online, by telephone, or at a retail store to redeem the gift card for the gift. In another embodiment, users can access the website without being required to use a password.

In another embodiment, the method includes a step wherein the recipient must also register for access to the website, thereby providing certain predetermined personal information, to activate the gift card. Once the recipient has registered and logged in to the website, the recipient may activate the card to redeem the gift. If the recipient accepts the gift, acceptance confirmation may be provided. Shipping confirmation may also be provided via the website, email, or mail where the gift is to be shipped to the recipient rather than received at a retail store.

The website may include an avatar created from software that generates a human voice to orally describe the products being advertised, provide instructions, greet the individual accessing the website, provide gift card delivery status, or provide information pertaining to points or rewards earned through use of the card issuer's website. The avatar and its related software can provide dynamic personalization to user account accessible via the website by communicatively linking the avatar software to a database stored on a server. The database can include user information such as, for example, the user's name, address, birth date, anniversary date, and other personal information that is associated specifically with the user. The system can include text-to-speech software that converts text entered into the system and preselected user information obtained by the avatar software from the database into an audio file that sounds similar to or mimics a human voice. The avatar's speech can include reading or playing aloud the website user's name as part of a greeting message to the user. In another example, the audio file which appears to be spoken by the avatar can include a birthday greeting message on or around the time of the user's birth date.

In one embodiment, the system may use data related to the user's shopping interests and previous purchases to suggest gifts through information "read" aloud by the avatar. For example, if the user/gift giver is shopping on or around the time of Mother's Day, the system by means of the avatar speech can recommend a gift to the gift giver similar to the gift that the gift giver purchased for the gift recipient the previous year. In another embodiment, the system's avatar may recommend a variety of gifts for purchase by the gift giver which are appropriate for the occasion. For example, if the gift giver is shopping on the website for a female gift recipient's birthday gift, the avatar may "read" descriptions of one or more gift items such as, for example, jewelry or women's perfume. In this way, the appearance and content of the website's web pages and content can be customized to be predictive based upon the user's history and habits recorded by the system during the user's previous visits to the website.

If the gift giver has selected a particular gift for the recipient, which can be indicated in information provided on the gift card, and if the recipient desires a different gift than the one selected by the gift giver, the recipient may choose a different gift of the same or a lesser value by accessing the card issuer's website and following instructions provided therein for changing the gift selection.

In another embodiment where the card issuer is a brick-and-mortar retailer, the recipient may redeem the card to receive the gift by visiting one of the retailer's store locations.

The invention also relates to a method for gifting and advertising. In one step of the method, when the recipient accesses the card issuer's website to activate the gift card, the recipient will have the option to send a thank you message, which can be delivered via email, to the gift giver.

In one embodiment of the method, the website may be customized to have a different appearance or to contain different content, for example, advertising content, for each gift giver and recipient that accesses the website. Advertisements on the website can be linked or hosted.

The invention also relates to a method of gifting that can include the use of a unique card identifier that can be an alphanumeric identifier such as, for example, a hexadecimal number, stock keeping unit (SKU), or standard gift card number (e.g., a standard sixteen-digit gift card number), or the unique card identifier can be a bar code having any of the aforementioned identifiers encoded thereon. The method can include the step of providing a printed material including a plurality of gift representations each representing an actual gift item. A unique printed alphanumeric identifier stored on a server can be assigned to each of the plurality of gift items represented by the plurality of gift representations. The method can be used to associate tracking data with each alphanumeric identifier. The method can also provide a website that is connected to the server via a communications network by which a user can purchase at least one gift item selected from among the plurality of gift representations appearing in the printed material. The user can be required to enter the alphanumeric identifier assigned to the selected gift item into a graphical user interface of the website. The method can also require the user to provide personal information through the graphical user interface of the website. The alphanumeric identifier can be associated with the user, e.g., in a database in which alphanumeric identifiers are each associated with one of a plurality of users.

Where a hexadecimal number or SKU is used, the method may include the step of converting the alphanumeric identifier into a standard sixteen-digit gift card number that is acceptable at POS terminals in retail locations.

The method can also include the step of analyzing the tracking data, personal information, browsing habits, and shopping habits of the user collected during the user's access to the website to determine the user's predicted shopping preferences. Advertisements may be presented to the user based upon the user's predicted shopping preferences.

The method may include the step of purchasing a gift item through the website to be gifted by the user to a gift recipient, wherein the user is a gift giver. Another step of the method can include delivering a gift card to the gift recipient. The gift card can feature a gift representation of the actual gift item selected and purchased by the gift giver. The gift card may be redeemed for the actual gift item by the gift recipient providing the gift recipient's personal information through the graphical user interface of the website.

The method can be used to record data related to the shopping and purchasing activities of the gift giver and gift recipient accessing the website. Using the recorded data, gift items can be suggested to the gift giver for purchase by the gift giver during the gift giver's subsequent visits to the website based upon the gift giver's shopping and purchasing activity data during previous visits to the website. The gift recipient may redeem the gift card for the gift item selected and purchased for the gift recipient by the gift giver. Alternatively, the gift recipient may reject the gift item selected and purchased by the gift giver and to select a different gift item chosen by the gift recipient.

The invention also relates to a method that can be used to advertise and promote retail goods and services through gifting. Once the user, e.g., a consumer, a gift giver or a gift recipient, has accessed the system website, the user may elect to play and view an advertisement, which features information related to a retail item. The retail item can be a good or a service. Through the website, the user can then be asked or presented with a series of questions related to the retail item. The user can be awarded points based upon the number of questions answered correctly by the user. The user may then redeem the points awarded by the system for a reward item. The reward item can be a downloadable movie, a downloadable song file, a downloadable audiobook, a pay-per-view movie, a downloadable image file, a downloadable computer screen saver, a downloadable video file, or a movie rental voucher. The method can permit a gift giver to gift points earned or a reward item selected by the gift giver to a gift recipient.

In another step of the method, when gift givers and recipients access the card issuer's website they may be shown advertisements and other marketing information provided by the card issuer, retailers, and/or manufacturers. The advertising information may be provided as video and/or audio presentations, still photographs, and/or text advertisements. The advertising information can also be provided through games in which the gift giver or recipient answers questions to earn points that are redeemable for rewards. Where the website is operated by a third party and not by one or more retailers or manufacturers, the retailer and/or manufacturer may pay for the rewards earned by users of the website. The questions on the website may be directed to information about the retailer and/or manufacturer's products. Consumers can be rewarded or paid to watch advertisements. A consumer may earn reward points by watching advertisements on the website and answering questions about each advertisement correctly. The consumer may also be awarded points for making purchases through the website including gift card purchases. The number of points awarded may also be dependant upon another variable such as the number of seconds of advertising watched while the gift giver or recipient is accessing the website. Examples of rewards that may be earned through the game-like advertising on the website include streaming and downloadable movies that can be viewed online, pay-per-view movie credits, music downloads, gas credits, or any other suitable product or service. In one embodiment, the interactive gifting system permits the consumer to select the advertisements that he or she watches.

The method can include the step of using the system to record the number of correct and incorrect answers provided by the consumer. Other information such as, for example, information concerning the specific questions answered correctly or incorrectly by the consumer can also be recorded. In this way, more points may be awarded to the consumer for answering certain questions correctly than other questions. Because the method incorporates these data mining features that are recorded in association with the identity and personal information of a specific consumer, advertisers can receive more viable, and valuable, leads related to individuals to which the advertiser should target its advertisements and promotions.

The method and systems related thereto are viral in that one consumer can refer another consumer to the website for the system. In one example, the referral is accomplished by a gift giver delivering a gift card to a gift recipient so that the recipient is directed to the website by instructions included with the gift card in order to redeem the gift. Once the recipient accesses the website, in addition to redeeming the gift card for a gift item, the recipient may also engage in game play of a commercial game, e.g., watching advertisements on the website and answering questions concerning those advertisements to earn reward points that are redeemable for a retail good or service. The method can also include steps in which a first consumer refers a second consumer to the website by emailing a link to the website, by word-of-mouth, or by submitting the second consumer's e-mail address or other contact information through the website to allow the system to generate an e-mail, direct mail, or other communication to the second consumer with information related to the game and reward point system.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A system comprising:
 a website comprising a graphical user interface accessible by a gift giver via a communications network, wherein the website includes account management features that permit the gift giver to transfer funds to a card issuer, wherein the gift giver defines a gift recipient using the website by providing by submission through the website predetermined identifying information related to the gift recipient;
 a form comprising one unitary sheet with detachable components, wherein a printing device is used to print at least one customization onto one or more customizable spaces of the form and wherein the detachable components comprise:
  a gift card associable with the gift recipient whose identity is validated via the website prior to releasing the funds transferred to the card issuer for the gift card, the gift card comprising a unique card identifier, wherein the website provides tools to create an electronic version of the gift card for electronic transmission to the gift recipient;
  a correspondence piece comprising a greeting card to carry the gift card; and
  an envelope into which the gift card and correspondence piece are inserted;

a remote server connected to the communications network that receives information from the website, the remote server comprising a data storage device to store data comprising information relating to the gift giver and the gift recipient;

funds data associated with a fund account stored on the remote server, wherein the funds data relate to the funds transferred by the gift giver to the card issuer; and means for the gift giver to deliver the gift card to the gift recipient; wherein the delivery means comprises both physical delivery of the gift card and electronic delivery of the gift card via the communications network, the electronic delivery comprising the steps of:

(a) providing the gift recipient with the gift card comprising the card identifier and an electronic address to access the website by the gift giver;

(b) accessing the website by the gift recipient;

(c) using the website, submitting the card identifier and the information relating to the gift recipient by the gift recipient to validate the identity of the gift recipient;

(d) electing to redeem the gift card by the gift recipient whose identity has been validated by software of the system; and (e) providing the funds by the card issuer for use by the gift recipient to redeem the gift card;

wherein the gift recipient must be verified using the website prior to redeeming the gift card;

wherein the form and its detachable components comprise paper.

2. The system of claim 1, wherein the electronic version of the gift card is embedded in or attached to an e-mail message.

3. The system of claim 1, wherein the detachable components of the form are part of the sheet and are separable from one another and from the sheet.

4. The system of claim 3, wherein the gift card is insertable into and concealable within a pouch of the envelope when the envelope is configured in an unsealed closed configuration, the gift card and the envelope being detachable from the sheet.

5. The system of claim 3, wherein the gift card is removable from a pouch of the envelope so as to be visible when the envelope is configured in an open configuration, the gift card being at least partially connected to the envelope such that the gift card is repositionable by opening the envelope.

6. The system of claim 3, wherein the gift card is detachable at a perforation from an affixed portion that is connected to an inner surface of the envelope tongue.

7. The system of claim 6, wherein, once detached, the gift card is insertable into a pouch of the envelope, and wherein the envelope is sealable in a sealed closed configuration for delivery to the recipient.

8. The system of claim 1, wherein the gift card is attached by adhesive to an inner surface of a tongue of an envelope.

9. The system of claim 1, wherein the means for delivering comprises inserting the gift card into the envelope with the greeting card for delivery by mail or other suitable delivery methods.

10. The system of claim 1, wherein the gifting system further comprises a catalog that is contained within the envelope.

11. The system of claim 1, wherein the envelope is manufactured around the gift card and other contents that are enclosed within the envelope.

12. The system of claim 9, wherein the envelope comprises a detachable stub.

13. The system of claim 12, wherein the detachable stub is connected to a tongue of the envelope at a bottom edge of the tongue.

14. The system of claim 1, wherein the form further comprises a gift representation.

15. The system of claim 14, wherein the gift representation comprises an image of a gift item that is redeemable by the recipient using the gift card.

16. The system of claim 1, wherein the electronic gift card comprises a downloadable file, a web page, a virtual card or an e-mail.

17. The system of claim 1, wherein the electric gift card comprises a part of an electronic greeting card that is delivered electronically to the recipient.

18. The system of claim of claim 1, wherein the electronic gift card is printable on a printing device and is redeemable at a retail store location.

19. The system of claim 1, wherein the electronic gift card comprises one or more items selected from the group consisting of: alphanumeric text and other type characters, images, audio data, video data, and any other type of data suitable for inclusion in or attachment to the electronic gift card.

20. The system of claim 1, wherein the gift card comprises a retailer-issued issued gift card.

21. The system of claim 1, wherein the gift card comprises a manufacturer-issued gift card.

* * * * *